United States Patent [19]

Gabrys

[11] 3,997,286
[45] Dec. 14, 1976

[54] MOLDING APPARATUS AND VACUUM SYSTEM THEREFOR

[75] Inventor: Kenneth F. Gabrys, Streamwood, Ill.

[73] Assignee: Chicago Rawhide Manufacturing Company, Elgin, Ill.

[22] Filed: Mar. 15, 1976

[21] Appl. No.: 667,082

[52] U.S. Cl. .......................... 425/405 R; 425/406; 425/409; 425/DIG. 60; 425/127; 425/DIG. 47
[51] Int. Cl.² ...................... B29H 9/10; B29G 1/00; B29G 3/00; B29D 3/00
[58] Field of Search ............... 425/405 R, 406, 407, 425/408, 409, 411, 412, DIG. 60, 127, DIG. 47

[56] References Cited
UNITED STATES PATENTS

| | | | |
|---|---|---|---|
| 2,478,812 | 8/1949 | Drake | 425/405 X |
| 2,542,874 | 2/1951 | Locatelli | 425/405 X |
| 2,812,543 | 11/1957 | Stacy | 425/406 |
| 3,142,093 | 7/1964 | Tribbett | 425/406 |
| 3,267,517 | 8/1966 | Altermott | 425/DIG. 60 |
| 3,541,642 | 11/1970 | Bernardi et al. | 425/405 X |
| 3,689,186 | 9/1972 | Winter | 425/405 R X |
| 3,712,785 | 1/1973 | Hirt et al. | 425/405 R |
| 3,773,454 | 11/1973 | Horve et al. | 425/DIG. 47 |
| 3,936,257 | 2/1976 | Christiansen | 425/DIG. 47 |

Primary Examiner—J. Howard Flint, Jr.
Attorney, Agent, or Firm—James T. FitzGibbon

[57] ABSTRACT

A press and vacuum box combination for manufacturing articles from fluent, curable or hardenable material within a vacuum atmosphere, especially designed to provide access to the mold parts, optimum article handling and improved safety. The press has side frame members, a cross head lying in a horizontal plane and extending between the side frame members, an axially reciprocable ram movable between raised and lowered positions, a platen associated with the cross head and a platen associated with the ram. A mold part is associated with each of said platens, and the mold parts are arranged for movement between opened and closed positions. In the closed position, the mold parts define at least one cavity having the shape of an article to be molded in the press. One of the platens has means at one edge thereof for hingedly mounting the platen for movement between raised and lowered positions with respect to the cross head. Means are associated with the cross head for supporting the hinged mounting means. A vacuum box is provided which has a portion thereof affixed to the side plates and other portions defining a front opening. The box also has a generally vertically movable door covering the opening, upper and lower vacuum box walls associated respectively with said platens, with the upper and lower walls of said vacuum box being in air-tight engagement with the other vacuum box walls only in the raised positions respectively of said ram and said upper platen.

18 Claims, 8 Drawing Figures

Fig-1

MOLDING APPARATUS AND VACUUM SYSTEM THEREFOR

BACKGROUND OF THE INVENTION

The present invention relates generally to molding apparatus, and more particularly, to improved apparatus and methods for molding rubber articles, or composite articles which include rubber and another, stiffer material such as metal, under conditions of great precision, high volume and low cost.

In one of its aspects, the invention is concerned with maintaining predetermined vacuum level within a so-called vacuum box surrounding a multiple cavity mold which is opened and closed by a large molding press.

Today, precise parts having molded rubber components, such as oil seals which include a rubber sealing lip and metal mounting flange portion, are made in large quantities by molding methods which are sometimes referred to as compression molding, transfer molding and injection molding. Commonly, compression molding involves simultaneously manufacturing a large number of articles in a mold having multiple cavities; such a method is often very economical because tooling costs, although high, may be amortized over long production runs. High unit production is possible because many parts are produced with each cycle of the press.

As rubber part manufacturing technology has become more refined, and the demand for precision-made products has heightened, a common concern in the industry has become the application of proper vacuum technology to such rubber molding. Evacuating the space within and immediately surrounding a rubber molding cavity has been found necessary and advantages for a number of reasons. First, unlike thermoplastic materials, rubber materials achieve their cross-linking or curing by undergoing an exothermic reaction which, in addition to heat, usually also produces gases of various kinds as a reaction product. Moreover, high temperatures achieved in cross-linking, vulcanizing, or curing of the rubber vaporize components which might otherwise be solid or liquid at lower temperatures.

Properly used, a vacuum applied to the interior of a mold cavity from the outside thereof helps speed the flow of fluent rubber into the cavity and insures complete filling thereof. This is particularly advantageous where it is necessary that voids, pock marks, inclusions or entrapments of air, gases or the like must be avoided in the finished product. From a theoretical standpoint, applying vacuum to a mold is fairly simple and straightforward, but in practice, it has often proved difficult to obtain and maintain a suitable relatively constant vacuum level in the vicinity of multiple cavity molds over a long period of time while maintaining a consistent vacuum level.

Thus, for example, applying individual vacuum lines to the interior of each individual cavity in a multiple cavity mold adds complexity, and often more than offsets the economies realizable by multiple cavity molding. Moreover, in view of the fluent nature of the rubber material before curing, individual vacuum passages often tend to become completely or partially clogged during use, with the result that vacuum is not effective or only partially effective in certain of the cavities.

In large presses adapted to receive multiple cavity mold parts, the mere physical size of the press also creates a problem of loading and unloading which is usually solved only by providing top or bottom plates, or both, which tilt or slide toward and away from the operator to facilitate loading and unloading. Provision of movable parts such as these further reduces the possibility that merely surrounding the mold area with a simple vacuum box will prove satisfactory in making precision parts. Provision of other parts having relative motion, such as lower or intermediate plates, strippers, and loading trays still further complicates simple and economical application of vacuum theory to existing press and mold designs.

According to the present invention, a system is described which provides ready access to all parts of the mold, which provides simple and easy loading and unloading, and which further provides for rapid isolation of the mold parts themselves from the surrounding atmosphere so as to draw an effective vacuum on a closed mold. Moreover, presses made according to the invention allow full access to the mold elements immediately upon opening the mold for removal of parts and for easy mold cleaning.

In the prior art, a number of vacuum systems have been proposed as suitable for use with molding presses. Many of these, however, failed rapidly in use because they were themselves the subject of increased loading placed thereon by the mold itself in undergoing opening, closing, and full clamping force modes of operation.

In view of the foregoing and other drawbacks of the prior art, and in view of the need for improved apparatus and methods for rubber molding, it is an object of the present invention to provide an improved vacuum arrangement for a molding press.

Another object is to provide a vacuum box assembly which is particularly adapted for use with large molding presses containing multiple cavity mold plates.

A further object is to provide a combination press and vacuum arrangement wherein high closing forces may be applied to the mold parts, but wherein deflection occasioned thereby does not adversely affect the structure or integrity of the vacuum box.

Another object is to provide an improved, highly flexible vacuum system for a molding press which is compatible with various movements of the molding press as well as movements of the mold plates and other parts thereof during use.

A still further object is to provide a vacuum apparatus which creates minimum wear on itself and on associated mold parts during use, and which may therefore be cycled repeatedly without damage.

A still further object is to provide a molding apparatus having a novel arrangement of moving parts, whereby the vacuum box arrangement may be opened and closed during cycling of the press to facilitate loading and unloading of the mold plates as well as improved operator convenience and safety.

A further object is to provide a novel mounting and movement system for a combination mold plate and vacuum box arrangement.

Another object is to provide an apparatus which, in use, permits movement of certain mold parts within the molding press to different positions of use while providing a safety device to prevent accidental damage to the movable mold plates or to an operator.

Another object is to provide a vacuum arrangement for a molding press which permits relative motion between molding parts and stripper elements adapted to remove finished parts from the mold, all without loss of effective vacuum in use.

Another object is to provide a vacuum box arrangement for a molding press wherein a part of the vacuum box may be placed in an initially stressed position or mounted such that high mold closure forces will not be transmitted to the vacuum box mounting but will be transmitted to the press frame instead.

The foregoing and other objects of the invention, including objects inherent therein are achieved in practice by providing a vacuum box unit which includes sidewalls surrounding mold parts in the closed position thereof, means for sealing the mold parts in relation to the vacuum box, means permitting access to the area lying at least partially within the vacuum box and means permitting movement of the mold parts between different positions, including positions lying partially outside the vacuum area. Certain other objects are also accomplished by providing a novel mounting means and method for certain of the components of the vacuum box, particularly the movable components thereof.

The manner in which the foregoing and other objects and advantages are carried into practice will become more clearly apparent when reference is made to the following detailed description of the preferred embodiments of the invention set forth by way of example and shown in the accompanying drawings, wherein like reference numbers indicate corresponding parts throughout the several figures.

BRIEF DESCRIPTION OF THE PREFERRED EMBODIMENTS

While it is understood that the principles of the invention may be applied to a number of different types and forms of presses and that the principle is applicable to molding of articles other than rubber or composite rubber and metal articles, a description of the apparatus will be made with reference to an embodiment wherein the press is a straight-sided, so-called up-acting, single ram hydraulic press, wherein the mold parts comprise upper and lower plates each including plural mold parts cooperating to define a plurality of molding cavities, and wherein a stripper plate is disposed intermediate said plates for removing finished parts from the press unit.

Figure 1:
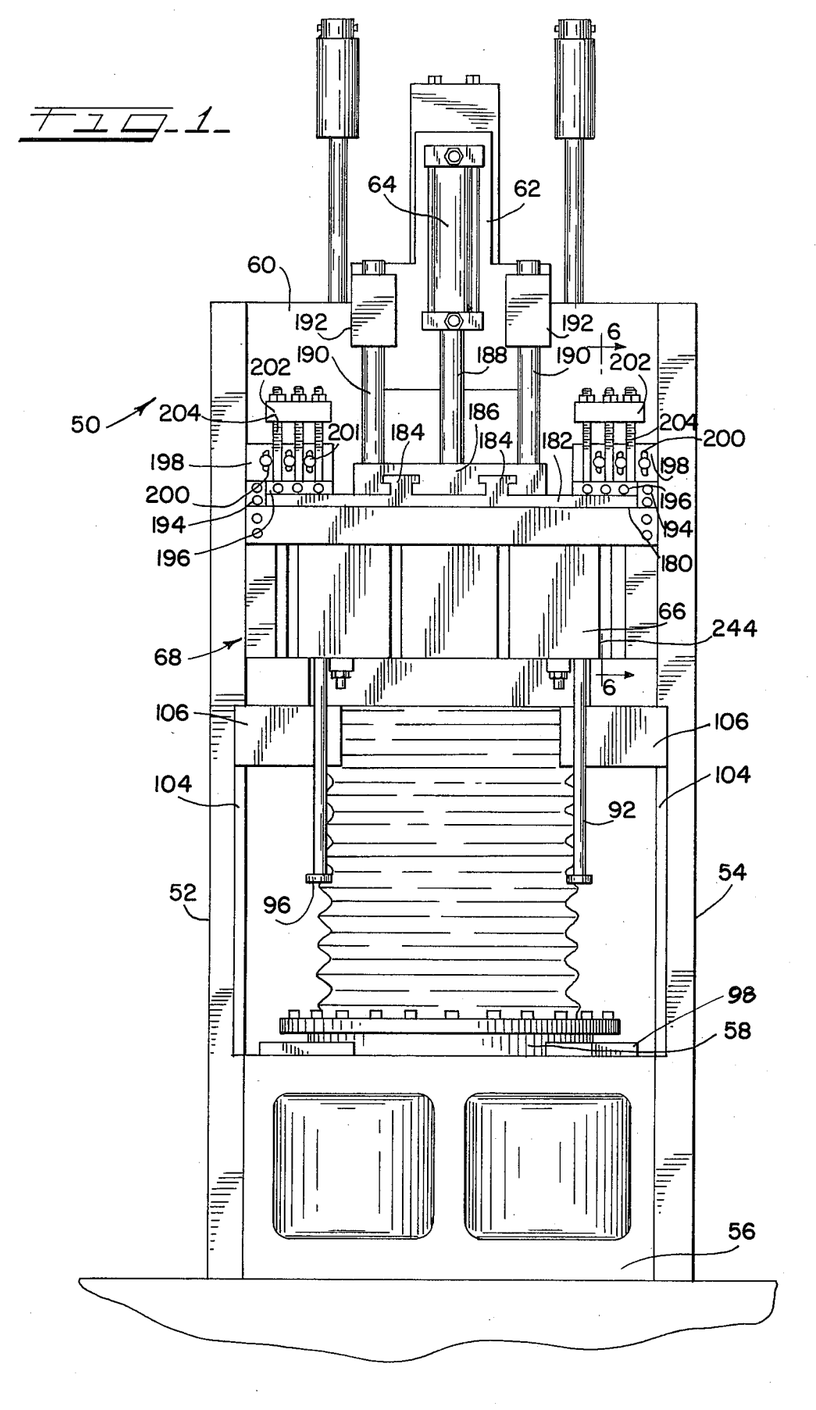
FIG. 1 is a front elevational view of a molding press, showing the movable platen in a raised position and showing a vacuum box assembly surrounding the mold plates and related components.
Figures 2, 8:
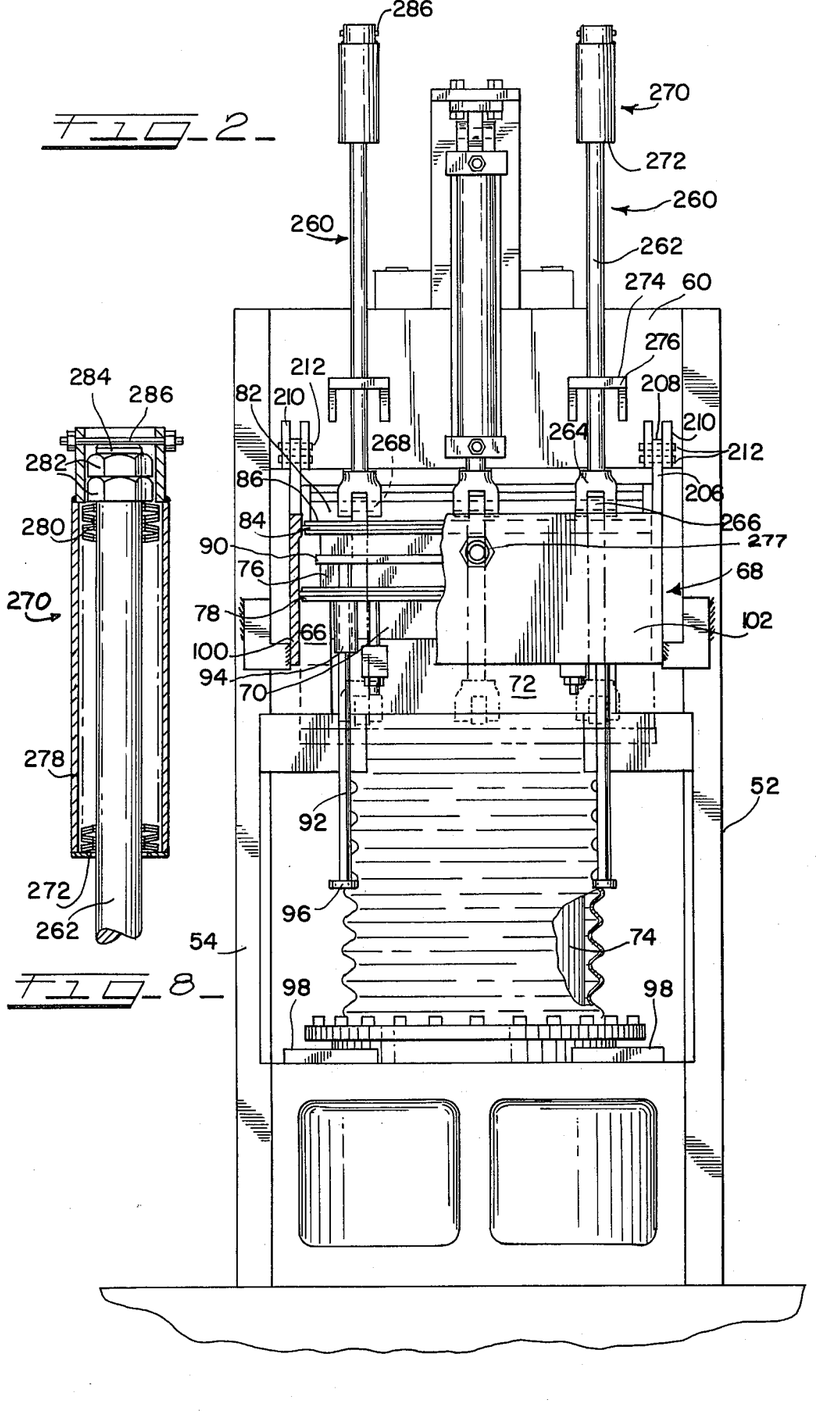
FIG. 2 is a rear elevational view, with portions broken away, showing the press of FIG. 1, parts of the mold plates and other elements disposed within the vacuum box, showing the mechanism for lowering the upper mold plate, and showing the lowered position of the upper mold plate in phantom lines.
FIG. 8 is a vertical sectional view of the shock absorbing device adapted to prevent damage to the press in the event the upper mold plate support means fails.
Figure 3:
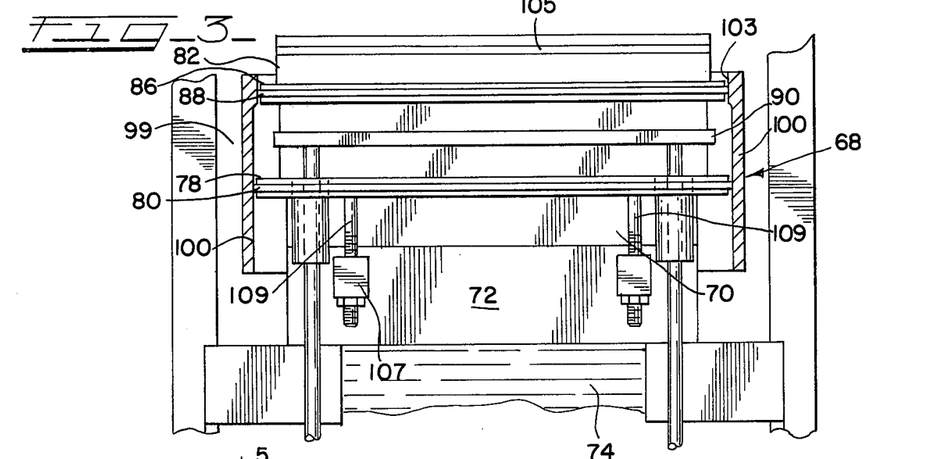
FIG. 3 is an enlarged fragmentary view, partly in elevation and partly in section, showing the sidewalls of the vacuum box, the upper and lower mold plates, and the gasket system forming the seal within the evacuated regions adjacent the mold plates.

Referring now to the drawings in greater detail, FIGS. 1, 2 and 3 show the invention to be typically embodied in a straight-sided, so-called up-acting hydraulic molding press generally designated 50, which includes left-and-right hand frame side plates 52, 54, extending upwardly from a lower housing 56 for the cylinder 58. A crosshead 60 extends transversely between the upper portions of the plates 52, 54 and provides a point of attachment for the plate 62 supporting the piston and cylinder assembly 64 which moves the door 66 covering the vacuum box assembly 68, in a manner described more fully elsewhere herein.

The press 50 also includes a lower platen 70 mounted on the head 72 of the ram 74, and a lower mold assembly 76 disposed atop the lower platen 70. A bottom wall 78 of the vacuum box 68 lies between the lower platen 70 and the lower mold assembly 76. The bottom wall 78 includes a resilient lower gasket 80 extending around the entire periphery of the bottom wall 78.

The press 50 also includes an upper platen 82, and an upper mold assembly 84, with a top wall 86 for the vacuum box disposed therebetween. An upper gasket 88 extends around the periphery of the top wall 86 in the same manner as does the gasket 80 in the bottom wall 78. A stripper plate 90 is disposed between the upper and lower mold halves 84, 76 and is supported on rods 92 extending through collars or sleeves 94 in the bottom vacuum box wall 78. The rods 92 terminate in enlarged feed 96 which are vertically aligned with the stripper rod receiver plates 98.

The vacuum box assembly 68 will thus be seen to be comprised of the front door 66 (FIG. 1), the side walls 100, the rear wall 102 and the top and bottom walls 86, 78, respectively. FIG. 3 shows the rear wall 102 in elevation, and the side walls 100 in section. From this view, it can be seen that the side walls 100 include shoulders 103 at the tops thereof which face inwardly and which engage the outer surfaces of the gasket 84 surrounding the top vacuum box wall 86. Consequently, the top wall 86 is narrower than the bottom wall 78, for reasons referred to elsewhere herein. FIG. 3 also shows that hold-downs 107 are affixed to the head 72 of the ram 74, and that fasteners 109 extending through the hold-downs secure the bottom vacuum box wall 78 tightly over the lower platen 70. The upper platen 82 includes a layer 105 of a heat insulating material, thus reducing heat transfer to the crosshead 60 of the press 50.

Figure 4:
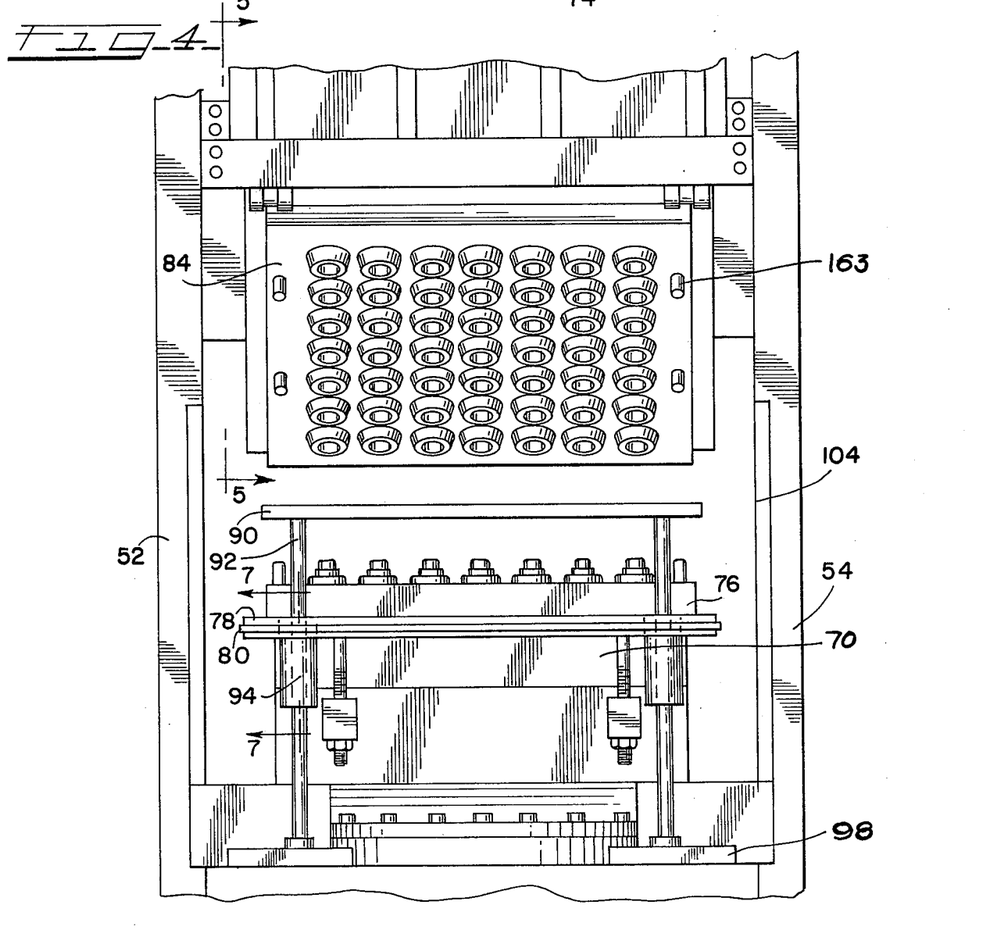
FIG. 4 is a front elevational view taken on an enlarged scale and showing portions of the molding press with the lower platen in the lowered position, the stripper plate spaced apart therefrom, and the upper mold member in its tilted down position, with the front wall of the vacuum box in a raised position.

FIGS. 1 and 4 show the beveled surfaces 104 on the corners of the side plates 52, 54 which serve to engage the arms 106 extending outwardly from the head 72 of the ram 74. These guideways 104, 106 cooperate with each other to prevent the platen 70 from rotating relative to the side plates 52, 54. Referring again to FIGS. 1–3, reference will be made to certain details of the vacuum box 68 and the manner in which it is supported, inasmuch as the construction and operation thereof are important features of the invention.

As shown in FIG. 1, a front cross bar 180 is disposed in front of the vacuum box door 66. When the door 66 is in its lowered position, the upper margin 182 of the door 66 extends just above the cross bar 180. Generally T-shaped extensions 184 of the door 66 are received within slots in a holder 186 which is received at the bottom of a door operating rod 188 extending downwardly from a piston and cylinder assembly 64. A pair of aligning rods 190 extend vertically through guide blocks 192 to insure properly aligned vertical motion of the door 66 and its associated parts.

As shown in FIG. 1, the vacuum box support assembly includes a pair of upper sidewall extensions 194 with a pair of mounting ears 196 lying inwardly thereof. The sidewall extensions 194 and the ears 196 are fastened to mounting supports 198 having elongated slots 200 therein to receive fasteners 201. Above the mounting supports 198 are a pair of hangers 202 welded to the cross head 60. Suspension bolts 204 extend downwardly from the hangers 202 to the ears 196. The upper sidewall extensions 194 are bolted directly to the side walls 100 (FIG. 2) of the vacuum box.

Referring again to FIG. 2, rear sidewall extensions 206 terminating in mounting ears 208 permit the rear portion of the vacuum box 68 to be suspended from the brackets 210 which are welded to the rear of the cross head 60. Dowels or pins 212 are provided to secure the ears 208 to the brackets 210. A welded base 209 also extends between the side plates 52, 54 and the bottoms of the side walls 100. For reasons which are detailed elsewhere herein, the rear portion of the vacuum box need not be mounted with the same accuracy as that of the front portion.

From the foregoing, it will be apparent that the side and rear walls of the vacuum box are affixed to the press frame by the brace 209 and by the ears and brackets 208, 210 at the rear of the press and by the mounting assembly at the front of the press which includes the hangers 202, mounting supports 198, ears 196, and side wall extensions 194. The combination of the adjustable suspension bolts 204 and the mounting supports 198 permits the front portion of the vacuum box to be suspended in a precisely aligned position in relation to the cross head 60. The front door 66, which is positioned by the rod 188 as well as by other members referred to elsewhere herein, is also located with respect to the cross head. In use, when the fixed walls of the vacuum box 100, 102 as well as the movable front door 66 and the top and bottom walls 86, 78 of the box are in the position of FIGS. 1–3, a vacuum is drawn and maintained within the interior 99 of the box 68.

Figure 5:
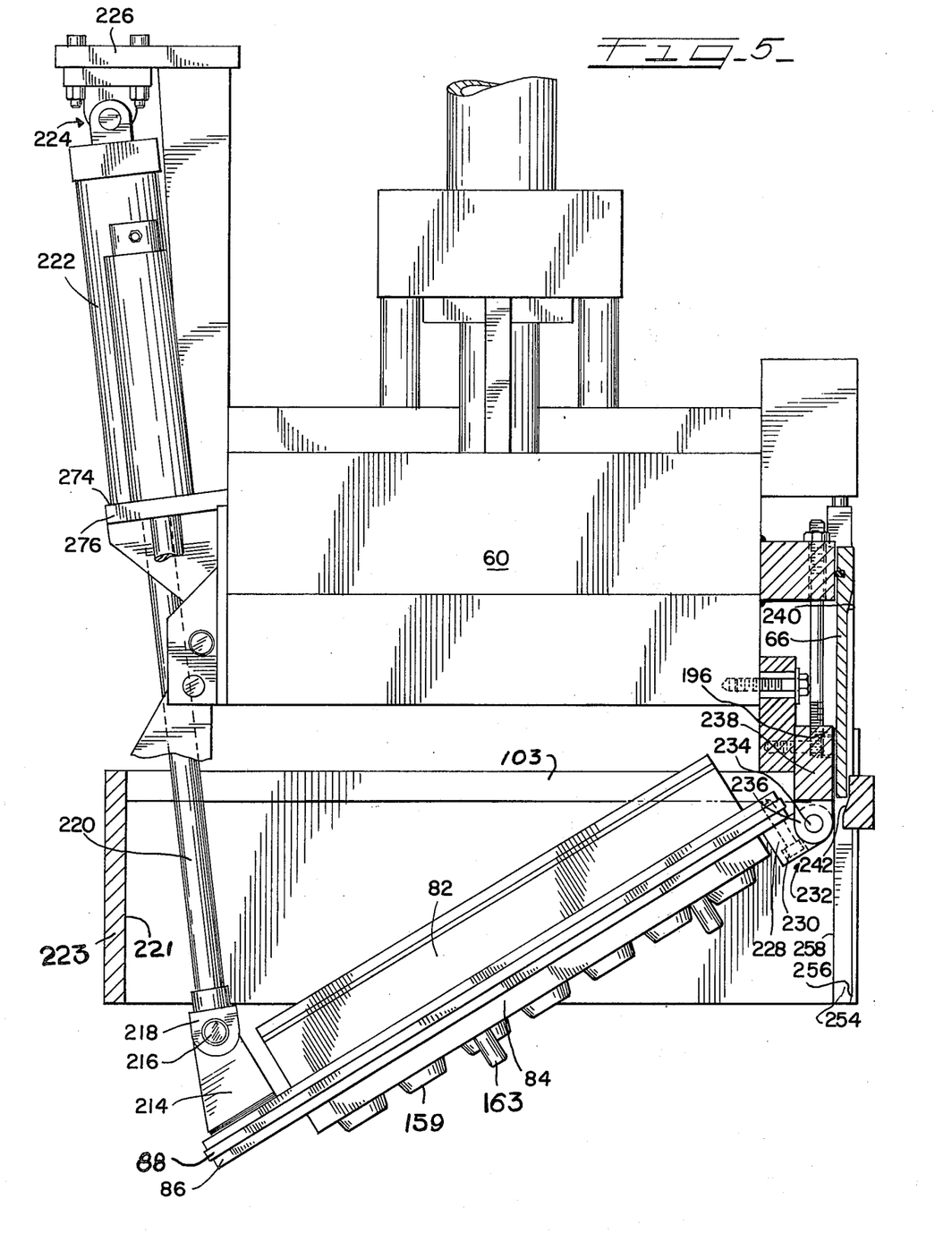
FIG. 5 is a side view, partly in elevation and partly in section, taken along lines 5—5 of FIG. 4 and showing the crosshead of the press, the upper mold plate in the lowered position, the front door of the vacuum box in a raised position and illustrating the operation of the upper mold plate lowering mechanism and the mounting thereof.

Referring now to another important feature of the invention, reference is made to FIGS. 4 and 5, which best show the manner of mounting the upper platen 82, the upper mold assembly 84 and top vacuum box wall 86 for pivotal or swinging movement. By contrasting FIGS. 2 and 4, it will be understood that the upper platen and mold assembly 82, 84 are disposed horizontally, with the upper platen resting snugly against the cross head 60 of the press when the press is closed, whereas, when the press is open for parts removal and for loading, the upper platen 82 and mold assembly 84 are tilted downwardly at the rear, that is, so that the upper mold assembly 84 partially faces an operator standing at the front of the machine 50. This is necessary because the platens or mold parts of large presses, and particularly those operating at high temperatures, must be made relatively accessible to the operator, who must inspect the cavities to insure that they are empty and that, where necessary, they have been sprayed with mold release agents. Accepted safety rules dictate that the interiors of the presses be accessible without causing the operator to lean over into the area between the ram and the cross-head.

Figure 6:
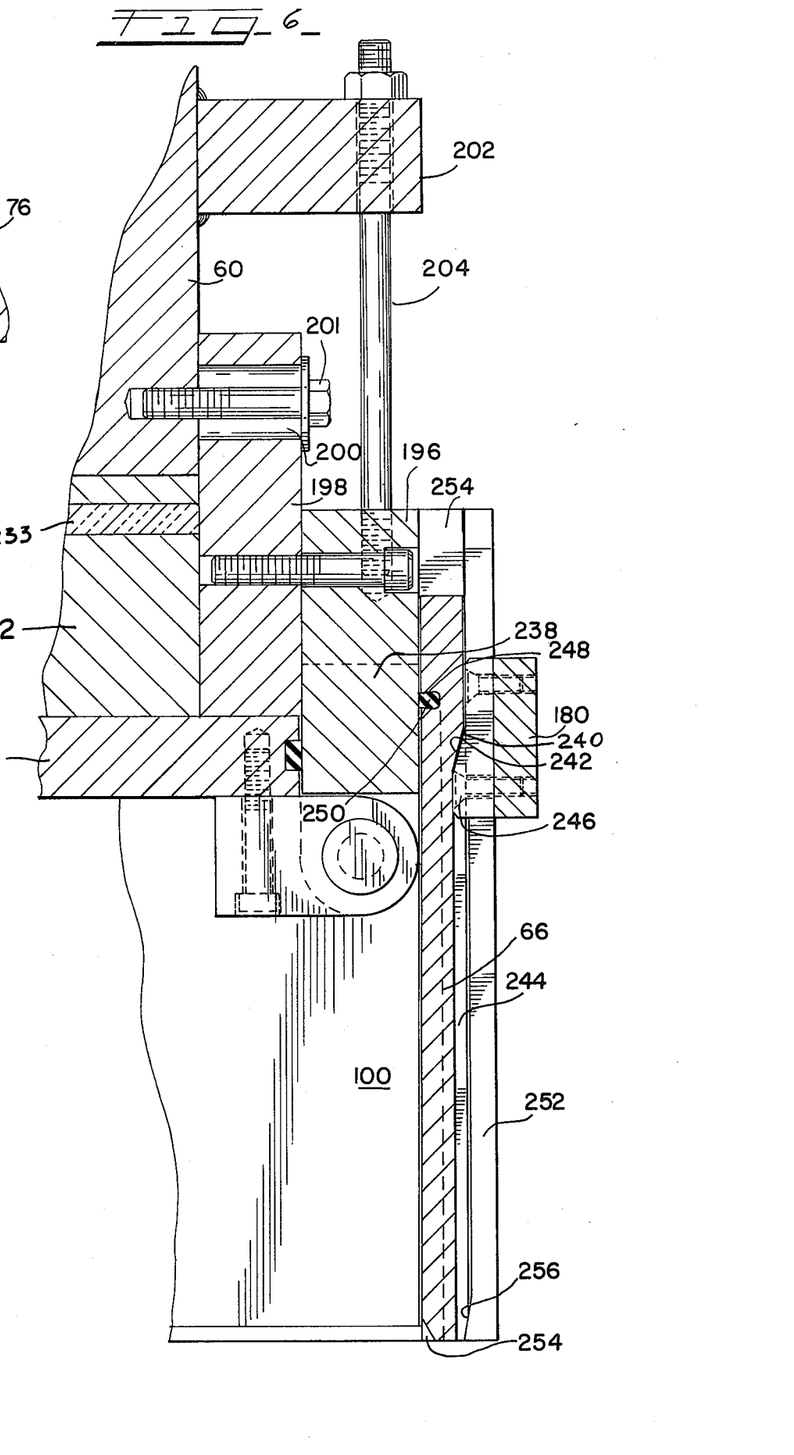
FIG. 6 is a vertical sectional view on a further enlarged scale, taken along lines 6—6 of FIG. 1 and showing a part of the mounting system for the upper mold plate and for the vacuum box of the invention.

Referring now in detail to FIGS. 5 and 6, the top vacuum box wall 86 is shown to include a clevis assembly including a bracket 214, a pin 216 and a fork 218 attached to the end portion of an actuator rod 220, the other end of which is received within a cylinder 222 mounted by a clevis 224 depending from an operating cylinder mounting bracket 226. Extending downwardly from the lower surface of the front of the wall 86 is a block 228 with a fastener 230 extending therethrough and forming a part of a hinge assembly 232 which cooperates with the rod 220 and piston and cylinder unit 222 to permit the upper platen 82 to swing through the necessary arc.

Referring again to the hinge 232, the hinge pin 234 extends through the block 228 and also through the hanger 236 which is attached to a rear cross bar 238 extending between and connecting the mounting ears 196 (FIG. 6). Consequently, the pivot point of the hinge assembly 232 defined by the pin 234 is determined by the location of the cross bar 238 and mounting ears 196 (which comprise a single piece) and which are in turn located by the position of the suspension bolts and hangers 204, 202 and held against movement by the fasteners 201 extending through the slots 200 in the mounting supports 198 and into the cross head 60.

Referring now to FIG. 6, which shows certain of the parts of FIG. 5 on an enlarged scale, the construction of the front cross bar 180, the door 66 and the parts associated therewith are shown. FIGS. 5 and 6 show that the door 66 includes a beveled surface 240 adapted to engage a cooperating beveled surface 242 on the front cross bar 180 when the door 66 is in its lowered position. Vertical slots (see also FIG. 1) 244 are provided in the door 66 for reception of the guides 246 of which the beveled surface 242 forms a part. With the guides 246 in the slots 244, the door will move vertically and will not cock from left to right as seen from the front. A seal-receiving groove 248 accommodates a resilient gasket 250 which extends across the top of the door 66 and vertically along either side of the back surface thereof for engagement with the front surfaces of the side walls 100. The inwardly directed side surfaces 252 of the side wall 102 contains a vertically extending slot 254 having a beveled bottom edge 256. When the door 66 reciprocates within this slot 254, and when the beveled surfaces 242, 256 engage the beveled door surface 240 and the bottom edge of the door, respectively, the door is urged rearwardly (to the left as in FIGS. 5 and 6), causing the edge of the gasket 250 to engage the rear cross bar 238 across the lateral extent of the front surface thereof and the forwardly directed surfaces 258 of the slot 254 in substantially airtight relation. The beveled surfaces act upon the door 66 only as the door reaches its lowermost position, with the consequence that the gasket is not undesirably forced to slide along the surfaces of the vacuum box during opening and closing movements of the door and swinging of the upper platen 82.

Referring now to another feature of the invention, FIGS. 2, 5 and 8 show the provision of a pair of safety devices generally designated 260 and adapted to insure that the upper platen and mold plate 82, 84 do not become damaged as a result of failure of the piston and cylinder 222 or of the pin 216 or parts associated therewith. The safety devices 260 include a rod 262 having a bifurcated end portion 264 fitting over an ear 266 secured thereto by a pin 268.

At the top of the rod 262 (FIG. 8) is a combination stop and shock absorber assembly 270 having a bottom surface 272 adapted to engage the top surface 274 of a stop bracket 276. The stop and shock absorber assembly 270 also includes an outer sleeve 278 within which are a plurality of Bellville washers 280 held in place by a pair of lock nuts 282 fitted over the threaded end portion 284 of the rod 262. A locating pin 286 extends through the sleeve 278 and insures that the sleeve or housing 278 will reciprocate with the upper end of the rod 262, carrying the shock absorbing Bellville washers 280 with it.

It will be appreciated, however (FIG. 8) that when the rod 262 is urged downwardly, it will be engaged by the upper surface 274 of the bracket 276, placing the stack of washers 280 in compression against the lock nuts 282. The high rate, short travel spring action provided by the washers 280 will quickly stop the platen and mold part 82, 84 from falling, while the shock will be cushioned by the provision of the springs 280. Because the pin 286 retains the assembly in place at the upper end of the rod 262, and because the surfaces 272, 274 do not meet during ordinary press operation, there is no wear on the shock absorber assembly 270 in normal use.

Referring now to the operation of the press and vacuum box assembly, it will be assumed that the press, all of which is illustrated in FIG. 1, is in the open position (FIG. 4) and that a press cycle is about to begin. It will be further assumed that the necessary material, such as metal stampings and rubber "preps" are properly positioned within the lower mold assembly 76. The upper platen 82, and its associated top wall 86 of the vacuum box 68 are disposed in the lowermost position permitted by the operating cylinder assembly 222. The front door 66 is in a raised position, where it is held by the rod 188. The stripper plate 90 is spaced upwardly from the lower mold assembly 76 and is supported by rods 92 having their bottom portions 96 resting on the stripper rod receiver plates 113.

When it is desired to operate the press, the piston and cylinder unit 222 is actuated, and the rod 220 raises the upper platen 82 by swinging it through an arc about the pivot point defined by the hinge pin 234. Referring to FIGS. 5 and 6, it will be apparent that the upper gasket 88 on the forward edge of the vacuum box top wall 86 engages the rearwardly directed surface of the rear cross bar 238 in air tight relation. The gasket 88 disposed adjacent the rear of the top wall 86 engages the forwardly directed surface 221 of the rear wall 223, while the laterally extending portions of the gasket 88 engage the inner surfaces of the shoulders 103 which are somewhat more closely spaced apart than are the inner surfaces of the side walls 100 disposed thereberneath. Consequently, during the time the swinging motion of the platen 82 takes place, there is relatively little sliding friction between the gasket 88 and the inner surfaces of the vacuum box assembly 68. This is because the gasket engages the vacuum box parts only near and at the top of the swinging stroke of the platen.

As the upper platen is thus swung into position, the front door 66 is moved downwardly by the door operating rod 188. As best seen in FIGS. 5 and 6, as the door is lowered, it is urged rearwardly and into snug engagement with the forwardly directed surfaces 258 of the side wall slots 254 by cooperation between the cam or beveled surfaces 242 on the front cross bar 180 and the counterpart beveled surfaces 240 on the front portion of the door 66. Likewise, the lower, outer edge portion of the door 66 engages a beveled corner 256 on the bottom of the door guide slot 244.

Thus, the door 66, which is held snugly with respect to the reciprocable rod 188 by reason of the holders and extensions 186, 184, is permitted by the slots 244 in the side walls 100 to move toward the rear of the press as the door 66 approaches the bottom of its stroke. Accordingly, the gasket material 250 does not engage the upper platen support member or the forward edges 258 of the slots 244 in the side walls 100, until the door 66 is completely closed, that is, in its lowermost position. This avoids any tendency to wear out the door gasket 250 which, as shown by the dotted lines in FIG. 6, extends downwardly on either side of the door 66 so as to present an inverted U-shape when seen in front or rear elevation. The slots 244 in the door 66 cooperate with the lower guide shoulders 246 in the front cross bar 180 to prevent cocking of the door 66.

At this point, the rear wall 223, the side walls 100, the front door or wall 66 and the top wall 86 of the vacuum box 68 have already been formed by movement of the top wall 86 and the door 66. Then, the lower platen 70 with its associated mold part 76 is moved upwardly by the hydraulic force acting upon the ram 74.

At a suitable height of the lower platen 70, the upper surface of the lower mold plate 76 engages the stripper plate 90, whereupon the plate 90 and its associated rods 92 move upwardly along with the platen 70. Further upward movement continues until the piston 74 advances the platen 70 and mold plate 76 to the position shown in FIGS. 1 amd 2, that is, with the stripper plate 90 tightly sandwiched between the upper and lower mold plates 84, 76. At this point, the gasket or seal 80 surrounding the bottom vacuum box wall 78 has engaged the side and rear walls 100, 223 of the vacuum box and the rear surface of the dront door 66. At this point, the vacuum source connected to the fitting 277 is actuated, to draw a vacuum within the whole interior of the closed vacuum box 68.

The molding process itself, normally referred to as compression molding, takes place as the rubber or other material becomes fluent in the presence of heat and pressure and flows into and fills the cavities defined by the mold parts 159, 161. Guides 163 serve to align the mold parts 76, 84. The form of molding cavity used may vary; such cavities of different forms are well known to those skilled in the art.

During the time following activation of the vacuum source, gases are evacuated from the interior of the entire sealed region, including those gases generated during vulcanization of the rubber as well as air and other gases which might be merely physically entrapped in the finished molded products.

Figure 7:
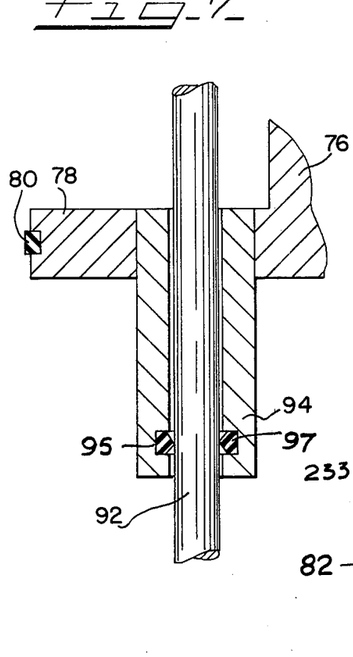
FIG. 7 is a fragmentary view on an enlarged scale, taken along lines 7—7 of FIG. 4 and showing the vacuum sealing mechanism permitting movement of the stripper plate without loss of vacuum within the vacuum box.

The vacuum seal for the box 68 is maintained while permitting movement of the stripper rods 92 relative to the lower platen 70, inasmuch as the sleeve 94 (FIG. 7) contains a groove 95 which receives an elastomeric seal 97 for maintaining an air tight relation between the sleeve 94 and the stripper rod 92 as the rod 92 moves with respect to the platen 70 and the lower mold plate 76.

Referring now to one important feature of the invention, it will be noted that, during set up of the press before beginning operation, the position of the upper platen 82 may be accurately fixed in relation to the cross head 60 so that loads applied through the platens 70, 82 with the mold halves 76, 84 sandwiched therebetween, are transmitted to the cross head and frame of the press rather than to the structure which supports the vacuum box 68. Accordingly, the rear cross bar 196 is fastened to the hanger 198, the hanger 198 is in turn located by the horizontally extending cap screws 200 and the support bolts 204 depending downwardly from the block 202.

During initial set up, the desired mold plates 76, 84 are secured to their respective platens 70, 82, and the bolts 204, 201 are positioned so as to hold the apparatus from slipping downwardly, but to permit slight upward movement thereof under strongly applied forces. Thereupon, as additional force is applied to the ram 74, as would be achieved in the full tonnage mode or high pressure clamping operation, the entire swinging assembly is forcefully pushed against the cross head 60. At this point, the bolts 201 are slightly loosened, the hanger bolts 204, which locate the supports 198 and the hinge assembly 232, are tightened so as to locate the upper platen 82 in the desired position with relation to the cross head 60. Thereupon, the bolts 201 receive maximum tightening, thereby insuring that the platen 82, will engage the cross head 60 in a flush relation.

If the cross head and the upper platen 82 are spaced from each other prior to press closing, the support mechanism will undergo excessive strain and the platen, being unable to achieve a "solid height" when the press is closed, will also deflect. If heat is to be transferred from the cross head 60 or its associated parts to the platen, flush, snug contact is also desirable, because lack of contact would minimize heat flow. If this is not a factor, insulation is used to reduce heat loss. If, on the other hand, the hinge pin 234 were to be situated too high, by reason of improper adjustment of the hangers 198, the upper, forward portion of the upper platen 82 would bind against the cross head 60 during completion of the upper platen-raising stroke. The entire front support assembly would then be highly strained.

Because the vacuum box is located in a fixed relationship to the press frame, it tends to move very slightly when the side plates 52, 54 are stretched. However, the adjustment at the front of the press is advantageous because closing forces applied to the swingable upper platen are in effect taken by the frame and cross head of the press and not by the hinge 232 which serves to locate the upper platen and which also serves to locate the front of the vacuum box.

Thus, according to the invention, press closing forces are not applied directly to the rear of the vacuum box, which is welded by brackets to the press frame. Likewise, press closing forces are not applied to the front of the vacuum box, which is supported by the cross head, provided that the adjustment for locating the hinge 232 is properly made. The novel support system for the vacuum box in turn makes such desirably precise location possible with great simplicity. The vertically elongated bolt holes 200 provide for adjustment of the support block 198 while the nuts atop the hanger bolts 204 provide a locating function for the rear cross bar 238, which extends between the side walls of the vacuum box and which is attached to the mounting ears 196.

As the press is used, over a period of many thousands of cycles, the side plates may take on a permanent set or stretch. Likewise, the parts supporting the vacuum box and upper platen and mold plate may do the same.

Still further, it is common to change tooling in the molds, with the result that there may be some variation in positioning of the upper platen. While this should not theoretically occur, because it is the platen and not the mold parts per se which contact the cross head, dimensional variations do in fact occur as the tooling is changed. Likewise, the insulating material and/or the heating elements shown schematically at 233 (FIG. 6) may take on a set or undergo cold flow, thus changing the effective height or thickness of the upper platen 82. In such a case, the adjustment feature is very advantageous.

Referring now to other particular features of the platen and upper mold plate suspension, it will be noted that there is a substantially vertically aligned relation between the hinge pin 234 and the shank of the hanger bolts 204. This eliminates a cocking tendency which would result from an offset relation of these parts. The horizontal forces generated by the fasteners 201 insures that the hinge pin 234 and the hinge assembly 232 will not move laterally, while also providing vertical support.

Proper contact between the upper forward corner of the upper platen 82 and the cross head 60 is insured by locating the corner inside the hinge pin 234.

The present construction provides easy access to the mold parts, advantages of safety and visibility at low cost, and provides a vacuum box surrounding the entire mold set. The exact configuration of the vacuum box is not established until the upper platen is raised and until the lower platen is within the side walls of the box and the door is closed. There is little, if any, wear on the gaskets, because the rear gasket of the upper platen swings into place and does not contact its mating surface until the platen is virtually horizontal; the side gaskets do not engage the vacuum box during most of the swinging motion, because of the presence of the shoulders 103. The door gasket is spaced from the front surfaces of the vacuum box until they are moved thereagainst by the camming action of the door guides. Raising and lowering the upper platen and tilting it forwardly is accomplished in a simple and effective manner. Safeguards are provided to prevent injury or damage. The construction provides for a stripper plate to travel with the lower mold parts throughout a portion of the stroke, but to act automatically to remove parts at the bottom of the stroke; relative movement of the stripper plate may be accomplished without loss of vacuum, by reason of the rod seals provided in the sleeves.

The advantages of a single vacuum box surrounding all of the cavities are maintained, along with the corresponding advantages of simplicity and greatly increases reliability of the vacuum systems. Parts made using the molding press and vacuum box of the present invention have proved highly satisfactory, and easy to remove from the mold. The construction provides improved visibility of the upper mold half, wherein scrap rubber is retained and must be removed, thus increasing the reliability of the molding process. The importance of this feature will be appreciated when it is understood that a large number of parts are made at a single stroke of the mold and, if scrap rubber is not removed, a number of parts subsequently attempted to be made can be ruined. The present invention helps overcome the problem.

It will thus be seen that the present invention provides an improved molding apparatus and vacuum system therefor having a number of advantages and characteristics, including those referred to specifically herein and others which are inherent in the invention. A preferred embodiment only having been described by way of example, it is contemplated that variations and changes to the form of apparatus described will occur to and may be those skilled in the art without departing from the spirit of the invention or the scope of the appended claims.

I claim:

1. In a press unit having a frame including side plates, a cross head extending laterally between said side plates, an axially reciprocable ram movable between raised and lowered positions, and means for moving said ram toward and away from the cross head, a pair of press platens, a mold part received within each of said platens, said mold parts being movable between open and closed positions and cooperating in the closed position thereof to define therebetween at least one molding cavity having the shape of an article to be molded, and a vacuum box forming a part of said press unit, said vacuum box including a front wall portion, side wall portions and a rear wall portion, means mounting the rearward portion of said vacuum box in fixed relation to said press frame, means associated respectively with said cross head and one edge portion of one of said platens, said associated means cooperating to mount said platen for swinging movement relative to said cross head, laterally outwardly directed platen extensions associated respectively with each of said platens, and energizable means extending between a portion of said one platen and a fixed portion of said press, said energizable means being adapted to swing said one platen between a first position parallel to said lateral extend of said cross head and a second position partially facing said vacuum box front wall portion, said platen extensions being arranged for cooperation with said wall portions of said vacuum box so as to define top and bottom walls of said vacuum box in the closed position of said mold parts.

2. A press unit is defined in claim 1 wherein said front wall portion comprises a front crossbar element which is fixed to said sidewalls and a front door element which is movable with respect to said sidewalls.

3. A press unit as defined in claim 1 wherein said means associated with said cross head is in the form of a portion of said vacuum box front wall which is mounted to a portion of said cross head.

4. A press unit as defined in claim 1 wherein said means associated with said cross head includes a portion of said vacuum box front wall, said portion of said front wall being adjustably mounted with respect to said cross head.

5. A press unit as defined in claim 1 wherein said associated means comprises a hinge assembly including a pin, a fixed portion attached to said front wall portion of said vacuum box and a movable portion forming a part of said one platen, said one platen further including a top surface portion adapted to engage the lower surface of said cross head in said first position of said one platen.

6. A press unit as defined in claim 1 wherein said energizable means includes a fluid-actuated piston and cylinder assembly having one end thereof attached to said cross head and a piston rod extending between said piston and an upwardly directed part of said one platen, said energizable means thereby lying on the exterior of said vacuum box when said one platen is in said first position.

7. A press unit as defined in claim 1 wherein said front wall portion includes a movable front door and a crossbar portion, and wherein said side walls include means for urging said door into engagement with a portion of said vacuum box side walls in the lower position of said door.

8. A press unit as defined in claim 1 wherein said vacuum box further includes means for attachment to an exterior vacuum source.

9. In combination, a molding press having a frame, a cross head, a movable ram and vacuum box forming components, said press further including upper and lower platens having mold parts adapted to register in the closed position of said press, and received respectively in said upper and lower platens, side wall, rear wall and front wall portions of vacuum box, at least some of said walls being fixed with respect to said press frame, outwardly disposed lateral platen extensions associated with said upper and lower platens, said platens being arranged for movement such that, when said press is in said closed position, said vacuum box walls and said extensions cooperate to define an evacuable region enclosing said mold part, whereby closing said press serves to create a vacuum box and opening said press serves to open said vacuum box.

10. A combination as defined in claim 9 wherein one of said platens has a portion thereof which is fixed with respect to one of said wall portions of said vacuum box.

11. A combination as defined in claim 9 wherein one of said platens is mounted for swinging movement between a first position tangent to one surface of said cross head and a second position wherein said mold parts are directed downwardly and at least partially toward said front wall portion of said vacuum box.

12. A combination as defined in claim 9 wherein said front wall portion includes a fixed portion and a movable door portion, said door, in an open position thereof, providing increased access to said mold parts received on at least one of said platens.

13. A combination as defined in claim 9 wherein one of said platens is adapted to swing downwardly and toward said front wall of said vacuum box, and wherein said front vacuum box wall includes a movable portion adapted to provide more ready access to said mold part received in said platen.

14. A system for mounting a molding press platen and a vacuum box assembly with respect to a press unit having a press frame and a cross head, said system including a vacuum box having a rear wall, side walls, and a front wall, means fixedly mounting said rear wall of said box to said press frame, a platen disposed at least partially witin said box, hinge means on said front wall portion of said vacuum box, at least one hinge pine securing said front wall to said platen, hanger means fixedly mounted to said cross head, vertically disposed support means extending between said hanger means and front wall, front wall mounting ears lying between oppositely directed vertical surfaces on said cross head and said front wall, means attaching said front wall to said mounting ears, said mounting ears including fasteners extending therethrough and into said cross head, said support means and said mounting ears being adapted to permit adjustable positioning of said vacuum box front wall and said hinge means.

15. A system as defined in claim 14 wherein said platen includes laterally outwardly disposed extensions adapted, in one position of said platen, to engage said front, rear, and side walls of said vacuum box to form the top wall thereof.

16. In combination, a molding press and a vacuum box, said press having side frame members, a cross head lying in a horizontal plane and extending between said side frame members, an axially reciprocable ram movable between raised and lowered positions, a platen associated with said cross head and a platen associated with said rim, a mold part associated with each of said platens, said mold parts being arranged for movement between opened and closed positions and defining, in the closed position, at least one cavity having the shape of an article to be molded in said press, one of said platens having, at one edge thereof means for hingedly mounting said one of said platens for movement between raised and lowered positions with respect to said cross head, means associated with said cross head for supporting said hinged mounting means, said vacuum box having sidewalls, a rear wall and portions defining a front opening, with a portion of said side walls affixed to said side frame members a generally vertically movable door covering said opening, upper and lower vacuum box walls associated respectively with said platens, said upper and lower walls of said vacuum box being in air-tight engagement with said vacuum box side and rear walls only in the raised positions respectively of said ram and said upper platen.

17. A combination as defined in claim 16 wherein means are provided for moving said door away from engagement with said side walls for movement to an open position and which further includes means for urging said door laterally into engagement with said side walls in the closed position of said door.

18. A press having a frame, a ram and a cross head, a vacuum box affixed to the frame at one end of said vacuum box, a top platen adapted to swing between an upper position at which said platen is parallel with and tangent to said cross head and a lowered position, and means mounting said top platen for pivotal movement with respect to said vacuum box, said mounting means being affixed to the other end of said vacuum box and being arranged for adjustable positioning with respect to said cross head.

* * * * *

UNITED STATES PATENT OFFICE
CERTIFICATE OF CORRECTION

Patent No. 3,997,286  Dated December 14, 1976

Inventor(s) Kenneth F. Gabrys

It is certified that error appears in the above-identified patent and that said Letters Patent are hereby corrected as shown below:

Column 4, Line 49, "feed" should read --feet--

Column 11, Line 50, "extend" should read --extent--

" Line 56, "is" should read --as--

Column 12, Line 68, "witin" should read --within--

Column 13, Line 1, "pine" should read --pin--

Signed and Sealed this

Seventeenth Day of May 1977

[SEAL]

Attest:

RUTH C. MASON
Attesting Officer

C. MARSHALL DANN
Commissioner of Patents and Trademarks